Oct. 27, 1953     R. R. McGEE     2,656,948
WEATHERPROOF ENCLOSURE FOR ELECTRICAL DEVICES
Filed March 31, 1949
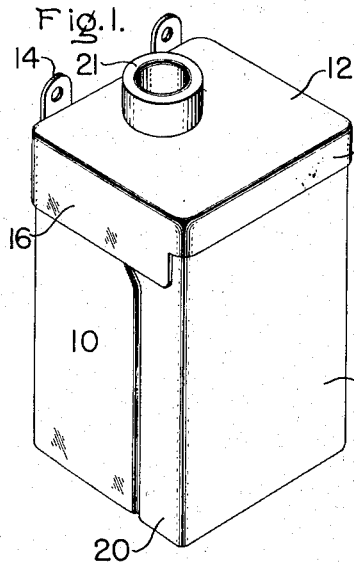
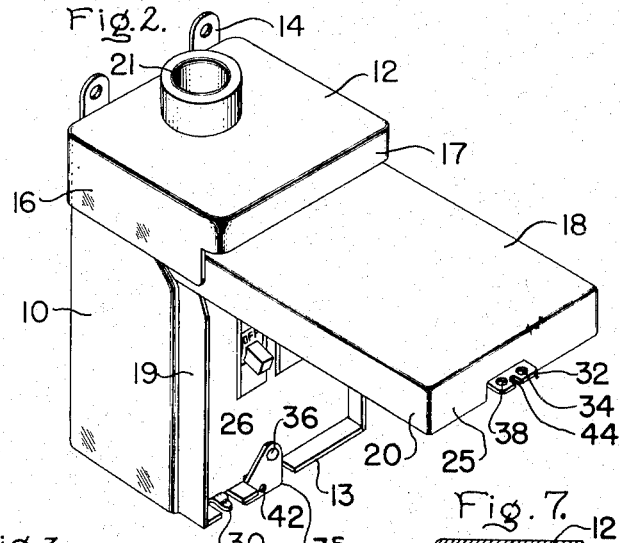
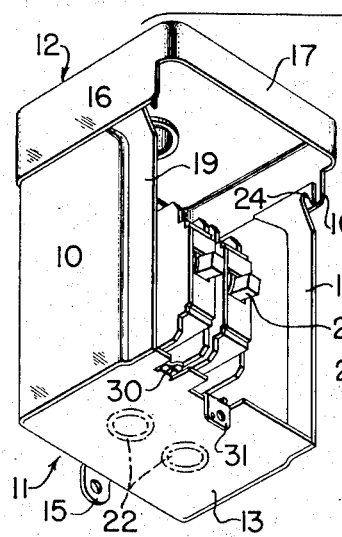
Inventor:
Richard R. McGee,
by
His Attorney.

Patented Oct. 27, 1953

2,656,948

UNITED STATES PATENT OFFICE 2,656,948

WEATHERPROOF ENCLOSURE FOR ELECTRICAL DEVICES

Richard R. McGee, New Britain, Conn., assignor, by mesne assignments, to General Electric Company, a corporation of New York Application March 31, 1949, Serial No. 84,662

3 Claims. (Cl. 220—29)

1

My invention relates to the protection of electrical devices such as switches, circuit breakers, relays, and fuses especially those which are used in places where they are subjected to exposure to inclement weather.

The main object is to provide an effective receptacle or box of this character in which such devices may be mounted and completely enclosed and yet which permits partial inspection and service for routine replacement or attention and also permits complete inspection and attention by authorized persons and which also permits locking or sealing the receptacle against tampering by any one except one specially authorized.

One object is to provide such a receptacle with a minimum number of exposed joints between the stationary and movable parts.

Another object is to provide a type of construction which is readily adapted to accommodate different forms of electrical devices with a minimum modification or variation of parts.

In the form shown, the receptacle has a body which is open at the front and provided with a cover hinged beneath a flange of the top and having flanges overlapping the front edges of the body when closed. Inside of the body is a plate hinged inside of the cover to shield the electric terminals in the receptacle and provided with an opening or openings for access to the replaceable fuses or resettable switch members in the receptacle as the case may be.

The drawings show one form of the invention.

Fig. 1 is a perspective view of the receptacle with the cover closed.

Fig. 2 is a perspective view showing the cover opened.

Fig. 3 is an exploded perspective view showing the box body and the shield and cover separated.

Fig. 4 is a fragmentary front view showing how the shield is sealed to the box and the cover padlocked to the shield.

Fig. 5 is a fragmentary section and side view of the parts of Fig. 4.

Fig. 6 is an exploded fragmentary front view showing the interlocking parts of the box, the shield and the cover.

Fig. 7 is a fragmentary sectional view showing how the shield and cover are hinged to the box body.

The body of the receptacle is formed of sheet material and has sides 10, 10, a back 11, a top 12 and a bottom plate 13 and may be supported by straps such as 14 and 15 secured to the back. The top has flanges 16, 16 and 17. Flanges 16, 16 overlap and are welded to the upper edge of

2 the sides and the front flange 17 serves to house the upper edge of the cover 18. The front edges or flanges 19 of the sides 10, 10 are offset inwardly to allow for the side flanges 20 of the cover. One or more walls of the body is provided with means for connection of wire ducts such as a nipple 21 or knockout 22.

The cover is hinged on a shaft 23 which passes through flanges 20, 20 and is supported in the forwardly and downwardly opening slots 24 in the upper edges of the flanges 19, 19 and inside of the side flanges 16, 16 of the top or hood of the receptacle. When the cover is closed its outer flange 25 shuts under the front edge of the bottom plate 13.

The shield plate 26 has lugs 27 by which it is hinged on shaft 23 and has an opening or openings 28 for access to such electrical members 29 as may be mounted in the receptacle, i. e. a circuit breaker, switch, fuse, etc. It will thus be seen that the housing or receptacle may accommodate any suitable device, the only special arrangement being the provision of suitable supporting members in the body and a shield having the proper opening for access. A resilient tongue 30 may be provided at the front edge of the bottom plate 13 to hold the shield 26 in place when closed.

I also propose to provide for latching the cover and the shield in closed position as may be desired for instance the bottom plate 13 has a turned-down lug 31 and the cover 18 has a lug 32 which overlaps lug 31 when the cover is closed and these parts have holes 33 and 34, respectively, which register and accommodate a locking or sealing device for preventing access to the receptacle except to an authorized person.

Shield 26 has a latching member 35 loosely hinged at 36 and has a hole 37 adapted to register with hole 38 in lug 32 and receive a locking device 39 when the shield and cover are closed as shown in Figs. 4 and 5.

It is also possible to seal the shield closed and leave the cover free to be opened. For this purpose, the lug 31 on the bottom plate 13 has a hole 41 with which the hole 42 in the latch 35 registers so as to receive a sealing wire 43 when the shield is closed. The cover lug 32 is notched at 44 in line with the sealing wire so as to permit the cover to be opened when the shield is sealed.

In order to lock the cover closed by insertion of a padlock or the like inserted through openings 34 and 33, it is first necessary to tilt the latch 35 into the position shown by dotted lines in Fig. 6. A lug 45 projects from the bottom plate 13 to serve as a stop in the path of movement of the shield.

From the foregoing it will be seen that when the parts 31 and 35 are sealed together the shield is immovable; when the parts 31 and 32 are locked together the cover is immovable; and when the cover is closed there is a minimum chance for water to run into the receptacle as there is no opening in the cover and the flanges are well overlapped.

The cover and shield may be entirely disconnected and removed from the body of the receptacle, when the cover and shield are free from the lug 31 at the front edge of the bottom plate. They may be then swung outwardly and then drawn downwardly so as to disengage the shaft 23 from the slots 24 in the side flanges. This leaves free access to the switch or other parts in the receptacle.

I claim:

1. A receptacle for an electrical device comprising a box body open at the front and having a top with flanges overlapping the sides of the body, a shaft supported by the sides of the body between the top flanges, a shield plate hinged to said shaft and having an opening for access to a device within the body and a cover hinged to said shaft beneath the top flange, said shaft with attached shield plate and said cover being removable from the body.

2. An enclosure for electrical devices comprising a box body open at the front and having a back, a bottom, sides and a top, the top having flanges overlapping the upper edges of the sides and also a flange depending in front of the upper portion of the body opening and the front edges of the sides being set in from the plane of the sides of which they are parts, and a closure assembly detachably secured to the body and comprising a cover having side flanges and a bottom flange, a shaft extending through said side flanges and demountably connected with the inset front edges of the sides by means of forwardly and downwardly opening slots formed in said inset front edges of the body beneath the flanges of the top where they overlap the edges of the sides, a shield hinged to said shaft and swingable into the opening in the box body to cover all but a part of the electrical devices within the box body, means for locking the shield in place, the side flanges of the cover overlying the inset edges of the body and the bottom flanges of the cover fitting under the front edge of the bottom of the body when the cover is closed, and means for locking the cover in place.

3. An enclosure for electrical devices comprising a box body open at the front and having a back, a bottom, sides and a top, the top having flanges overlapping the upper edges of the sides and also a flange depending in front of the upper portion of the body opening, a closure assembly secured to the body and comprising a cover having side flanges and a bottom flange, a shaft extending through said side flanges and connected with the front edges of the sides of the body beneath the flanges of the top where they overlap the edges of the sides, a shield hinged to said shaft and swingable into the opening in the box body to cover all but a part of the electrical devices within the box, means for locking the shield in place independently of the cover, the flanges of the cover overlying the front edges of the body and fitting under the front edge of the bottom of the body when the cover is closed, and means for locking the cover in place.

RICHARD R. McGEE.

References Cited in the file of this patent

UNITED STATES PATENTS

| Number | Name | Date |
| --- | --- | --- |
| 370,557 | Petersen | Sept. 27, 1887 |
| 762,888 | Decker | June 21, 1904 |
| 1,136,320 | Drake | Apr. 20, 1915 |
| 1,827,929 | Bigelow | Oct. 20, 1931 |
| 2,007,065 | Walker | July 2, 1935 |
| 2,250,977 | Walker | July 29, 1941 |
| 2,277,618 | Utter | Mar. 24, 1942 |
| 2,329,349 | Johansson | Sept. 14, 1943 |
| 2,330,975 | Jackson | Oct. 5, 1943 |
| 2,332,017 | Sedgwick | Oct. 19, 1943 |
| 2,359,628 | Daly | Oct. 3, 1944 |
| 2,393,034 | Ellis et al. | Jan. 15, 1946 |
| 2,438,841 | Casalino | Mar. 30, 1948 |
| 2,450,670 | Loeb | Oct. 5, 1948 |